United States Patent
Huang et al.

(10) Patent No.: US 9,736,429 B1
(45) Date of Patent: Aug. 15, 2017

(54) CLOUD VIDEO SYSTEM

(71) Applicant: Quanta Computer Inc., Taoyuan (TW)

(72) Inventors: Chen-Che Huang, Taoyuan (TW);
Yu-Hsing Lin, Taoyuan (TW);
Chin-Yuan Ting, Taoyuan (TW);
Chun-Hsiung Fang, Taoyuan (TW);
Hung-Bin Lin, Taoyuan (TW);
Shih-Ming Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/177,898

(22) Filed: Jun. 9, 2016

(30) Foreign Application Priority Data

Apr. 6, 2016 (TW) .............................. 105110707 A (51) Int. Cl.
*H04N 7/15* (2006.01)
*H04L 29/06* (2006.01)
*H04L 29/08* (2006.01)

(52) U.S. Cl.
CPC .......... *H04N 7/152* (2013.01); *H04L 65/1063* (2013.01); *H04L 65/1069* (2013.01); *H04L 65/403* (2013.01); *H04L 65/608* (2013.01); *H04L 67/06* (2013.01); *H04L 67/42* (2013.01)

(58) Field of Classification Search
CPC ............ H04N 7/14; H04N 7/147; H04N 7/15; H04N 7/152
USPC .................. 348/14.01–14.16; 705/3
See application file for complete search history.

(56) References Cited

U.S. PATENT DOCUMENTS

| | | | |
|---|---|---|---|
| 6,796,971 B2 | 9/2004 | Anderson et al. | |
| 8,588,111 B1 | 11/2013 | Kridlo | |
| 8,681,203 B1* | 3/2014 | Yin | H04N 7/15 348/14.08 |
| 8,878,888 B2 | 11/2014 | Rosenfeld | |
| 2006/0239296 A1* | 10/2006 | Jinzaki | H04L 12/40058 370/468 |
| 2013/0147900 A1* | 6/2013 | Weiser | H04N 7/15 348/14.08 |
| 2014/0118471 A1* | 5/2014 | Guo | H04N 7/155 348/14.09 |
| 2015/0221196 A1* | 8/2015 | Rafin | G06F 19/3418 340/521 |
| 2015/0278453 A1* | 10/2015 | Joao | G06F 19/322 705/3 |

FOREIGN PATENT DOCUMENTS

| | | |
|---|---|---|
| CN | 1318999 | 5/2007 |
| CN | 102204246 | 9/2011 |

OTHER PUBLICATIONS

Chinese language office action dated Jan. 10, 2017, issued in application No. TW 105110707.

* cited by examiner

*Primary Examiner* — Melur Ramakrishnaiah
(74) *Attorney, Agent, or Firm* — McClure, Qualey & Rodack, LLP (57) ABSTRACT

A cloud video system is provided. The cloud video system includes: a cloud server and a plurality of clients. The clients are connected to the cloud server via a network, and each client has an individual role. When the first of the clients has established a video session call with other clients, the cloud server determines whether to record the video session call according to the individual role of each client in the video session call.

9 Claims, 9 Drawing Sheets

CLOUD VIDEO SYSTEM

CROSS REFERENCE TO RELATED APPLICATIONS

This application claims priority of Taiwan Patent Application No. 105110707, filed on Apr. 6, 2016, the entirety of which is incorporated by reference herein.

BACKGROUND OF THE INVENTION

Field of the Invention

The invention relates to video conferencing, and, in particular, to a cloud video system.

Description of the Related Art

With recent advances in video coding and networking technologies, it is possible to use video conferencing to make remote healthcare management a reality, by allowing a healthcare provider to communicate remotely with the healthcare receiver. Although video conferencing sessions can facilitate healthcare management, these video sessions should be securely protected to safeguard the privacy and confidentiality of the health information of the healthcare receivers. In addition, the video conferencing sessions should also be archived so that the sessions can be reviewed in cases involving medical disputes. Only authorized administrators may be granted access to the content of archived video conferencing sessions.

Accordingly, there is a demand for a cloud video system that provides archiving and display of the video conferencing sessions.

BRIEF SUMMARY OF THE INVENTION

A detailed description is given in the following embodiments with reference to the accompanying drawings.

In an exemplary embodiment, a cloud video system is provided. The cloud video system includes: a cloud server and a plurality of clients. The clients are connected to the cloud server via a network, and each client has an individual role. When a first client of the clients has established a video session call with other clients of the clients, the cloud server determines whether to record the video session call according to the individual role of each client in the video session call.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
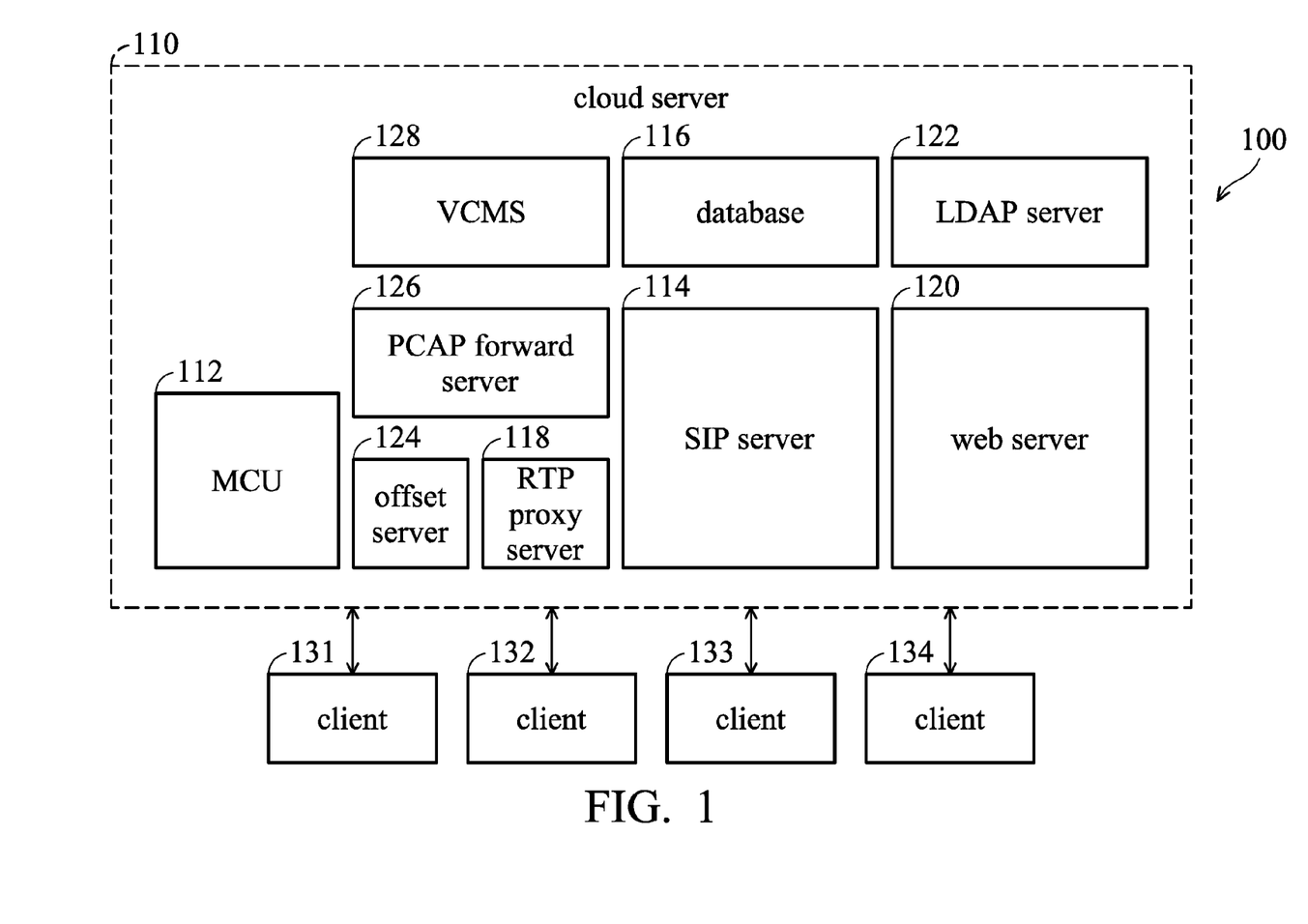
FIG. 1 is a block diagram of a cloud video system in accordance with an embodiment of the invention.

FIG. 1 is a block diagram of a cloud video system in accordance with an embodiment of the invention. The cloud video system 100 includes a cloud server 110, and clients 131~134, wherein the clients 131~134 are connected to the cloud server 110 via a network. The clients may communicate with each other using a video call through the cloud server 110. For example, the cloud video system 100 can not only be used as a video conferencing system, but it can also be used for healthcare. The clients can be different personal computers or mobile devices that are used by different healthcare providers, personal caretakers, patients, or their families.

In an embodiment, the cloud video system 100 may provide a user interface that enables the system administrator or healthcare provider to create accounts with a specified role, such as care providers and care receivers, via a web browser. For example, the healthcare providers may have the authority of a service provider on the cloud video system 100, and the personal care takers, patients, and their families may have the authority of service receivers on the cloud video system 100. It should be noted that there are four clients shown in FIG. 1 for purposes of description. One having ordinary skill in the art will appreciate that a different number of clients can be used in the application.

Specifically, the account of each of the clients 131~134 records user information, such as network phone number, phone book, and security codes, and the user of each client may make a video call on a dedicated application running on a personal computer or a mobile device through the cloud server 110. For example, after the user has logged onto the cloud server 110 and has been authorized by the cloud server 110, the user may retrieve associated user information from the cloud server 110, such as the phone book. Then, the user may dial another user in the phone book via his or her mobile device to initiate a video call. It should be noted that the service administrator may be in video calls with a plurality of service receivers simultaneously through the cloud server 110, the details of which will be described later.

The cloud server 110 includes a multipoint control unit (MCU) 112, a session initiation protocol (SIP) server 114, a database 116, a real-time transport protocol (RTP) proxy server 118, a web server 120, a lightweight directory access protocol (LDAP) server 122, an offset server 124, a packet-capture (PCAP) forward server 126, and a video content management system (VCMS) 128.

The MCU 112 can be used in a video conference having more than two participants, and the packets from different participants can be forwarded to other participants via the MCU 112. The SIP server 114 is configured to initiate a video session between the clients, and to maintain the connection between the caller and the callee in the video session. The database 116 stores user information for each user, such as the network phone number, phone book, and security codes, but the invention is not limited thereto. After the SIP connection has been established, the clients associated with the SIP connection may exchange packets through the RTP proxy server 118 using the secure real-time transport (SRTP) protocol, or real-time transport protocol (RTP).

The web server 120 provides a web user interface to the administrator of the cloud server 110 that enables the administrator to manage the settings of the cloud server 110 and the accounts of the clients, and the web server 120 also provides a user interface to the clients for logging onto the cloud server 110. The LDAP server 122 stores security information such as the security codes of each user, which are used for authorization when the user is logging onto the cloud server 110 via the user interface provided by the web server 120.

In addition, since every client may be located in different time zones, the local time of each client may be different, and the offset server 124 is configured to adjust the time offset between the clients, and provide the correct time information to the MCU 112 and the clients currently in established connections. When the video recording function of the cloud server 110 has been activated, the PCAP forward server 126 is configured to receive the PCAP files from the RTP proxy server 118, and upload the PCAP files and associated parameters to the VCMS 128. Meanwhile, the VCMS 128 may perform video recording on the received PCAP file, and assign an archive number to the recorded video file. For example, each recorded video file has a universally unique identifier (UUID), and the UUID is updated to the database 116 via the web server 120. The details of different operations on the cloud server 110 are described in more detail with the embodiments in FIGS. 2-8.

It should be noted that each component in the cloud server 110 can be implemented by different computers or servers, or alternatively implemented by a single computer or server.

Figure 2:
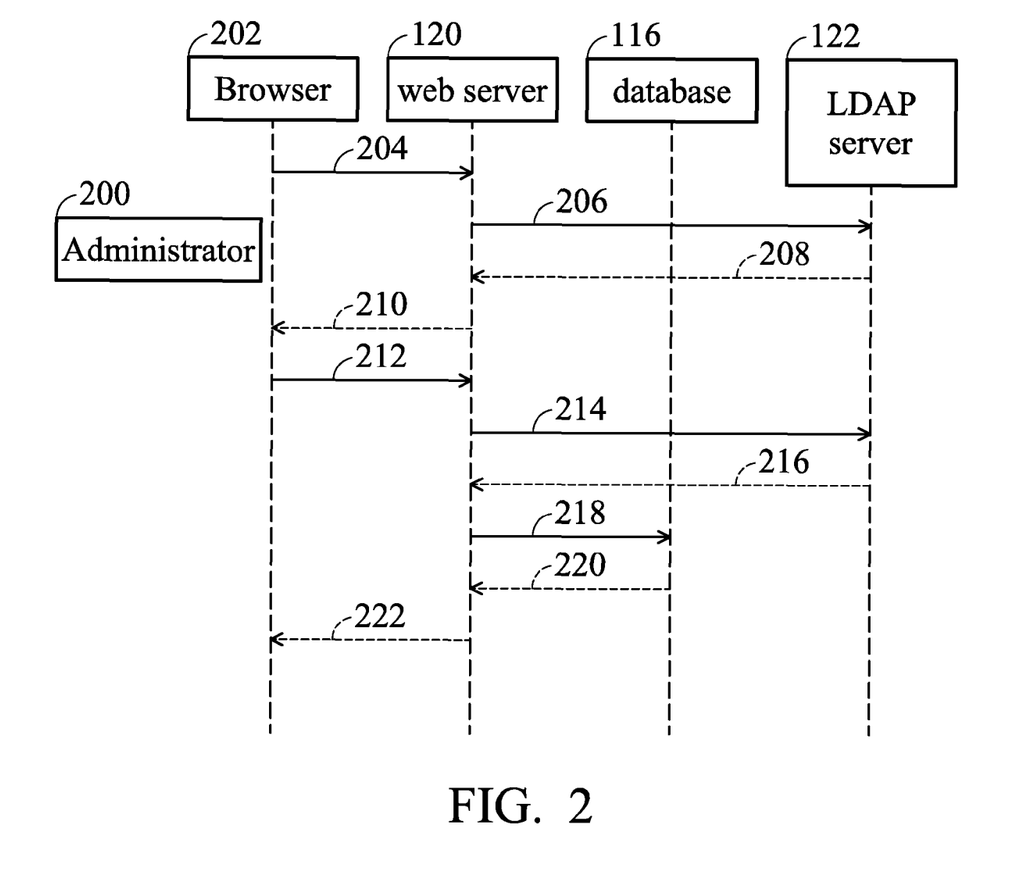
FIG. 2 is a flow chart of an administrator creating a user account via a web browser in accordance with an embodiment of the invention.

FIG. 2 is a flow chart of an administrator creating a user account via a web browser in accordance with an embodiment of the invention. As shown in FIG. 2, the administrator 200 creates an account for each client on the cloud server 110 via a web browser 202. In step 204, the administrator 200 logs onto the web server 120 via the web browser 202. In step 206, the web server 120 transmits an authentication signal to the LDAP server 122. In step 208, when the authentication is approved, the LDAP server responds to the web server 120 with an authentication success signal. In step 210, the web server responds to the web browser 202 with a login success message.

In step 212, the administrator 200 may create a user account on the web server 120 via the web browser 202, and assign a corresponding role or grant permissions to the created user account. For example, the role of the created user account may be a care provider or a care receiver. In step 214, the web server 120 transmits information of the user account to the LDAP server 122, and the LDAP server 122 responds by sending the UUID of the user account to the web server 120 (step 216). In step 218, the web server 120 stores the user information of the user account in the database 116. Upon successfully storing the user information, the database 116 responds to the web server (step 220) with a storing success signal, and the web server 120 responds by sending a creation success signal to the web server 202 (step 222).

Figure 3:
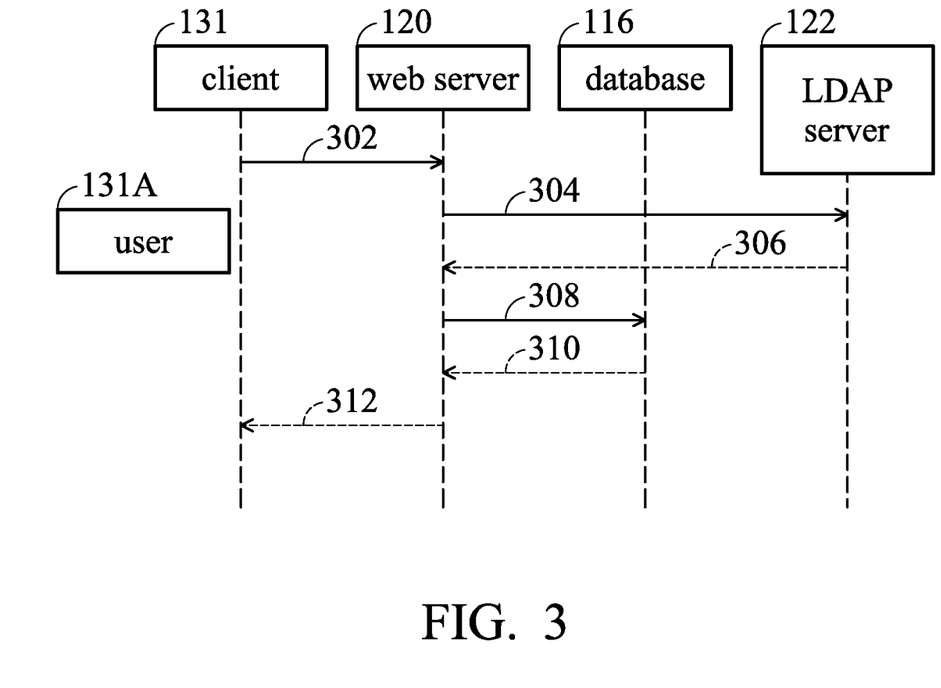
FIG. 3 is a flow chart of a user logging onto the cloud server to download user information in accordance with an embodiment of the invention.

FIG. 3 is a flow chart of a user logging onto the cloud server to download user information in accordance with an embodiment of the invention. As shown in FIG. 3, in step 302, the user 131A uses his mobile device (i.e. client 131) to log onto the web server 120. In step 302, the web server 120 transmits an authentication signal to the LDAP server 122. In step 306, when the authentication is approved, the LDAP server 122 responds by sending an authentication success signal to the web server 120. In step 308, the web server transmits a request signal to the database 116 to retrieve the user information of the user 131A. In step 310, the database 116 responds to the web server 120 with the user information. In step 312, the web server 120 transmits the retrieved user information to the client 131.

Figure 4:
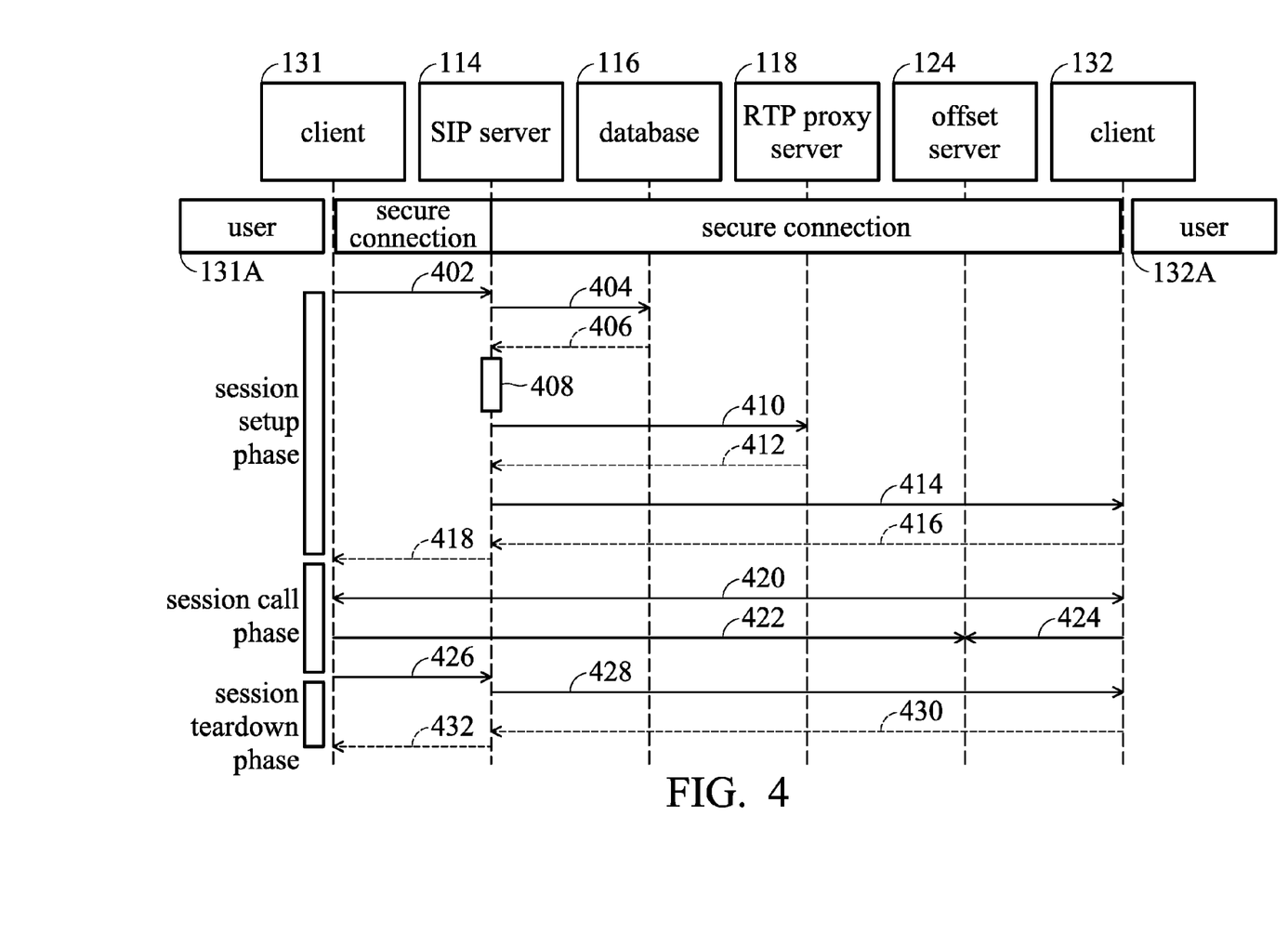
FIG. 4 is a flow chart of establishing and tearing down a 1-on-1 video session in accordance with an embodiment of the invention.

FIG. 4 is a flow chart of establishing and tearing down a 1-on-1 video session in accordance with an embodiment of the invention. After the flow of FIG. 3 ends, the user 131A may user his client 131 to establish an 1-on-1 video session with the client 132 of the user 132A, and the flow of FIG. 4 starts. In step 402, the user 131A is to establish a video call with the user 132A. For example, the user 131A (i.e. caller) may select the user 132A on the phone book of his client 131 to initiate the video session. Meanwhile, the client 131 transmits a session initiation command (e.g. SIP INVITE command) to the SIP server 114.

In step 404, the SIP server 114 queries the network address of the user 132A (i.e. callee) from the database 116, and the database 116 responds by sending the network address of the user 132A to the SIP server 114 (step 406). In step 408, the SIP server 114 determines whether to record the video session. For example, if the video call is an 1-on-1 video session and the combination of the caller and the callee is a care provider and a care receiver, the SIP server 114 determines to record the video session. In the following steps, for purposes of description, it is determined to record the video session.

In step 410, the SIP server 114 transmits a relaying and recording request signal to the RTP proxy server 118, and the RTP proxy server 118 sends relay information to the SIP server 114 (step 412). In step 414, the SIP server 114 transmits a session initiation command (e.g. SIP INVITE command) to the client 132. In step 416, when the user 132A accepts the video call via the client 132, the client 132 responds to the SIP server 114 with an acceptance success signal (e.g. SIP 200 OK command), and the SIP server 114 responds by sending the acceptance success command to the client 131 (step 418). Steps 402~418 can be regarded as a "session setup phase".

In step 420, the clients 131 and 132 perform a video call using the SRTP via the RTP proxy server 118, and the clients 131 and 132 respectively transmits their time offset information to the offset server 124 (steps 422 and 424). Steps 420~424 can be regarded as a "session call phase".

In step 426, the user 131A is to tear down the video call via the client 131, and the client 131 transmits a call termination signal (e.g. SIP BYE command) to the SIP server 114. Then, the SIP server 114 transmits the call termination signal to the client 132 (step 428). When the user 132A hangs up the video call via the client 132, the client 132 responds with an acceptance success signal (e.g. SIP 200 OK command) to the SIP server 114 (step 430), and the SIP server 114 responds by sending the acceptance success signal to the client 131 (step 432). Steps 426~432 can be regarded as a "session teardown phase".

Figure 5A:
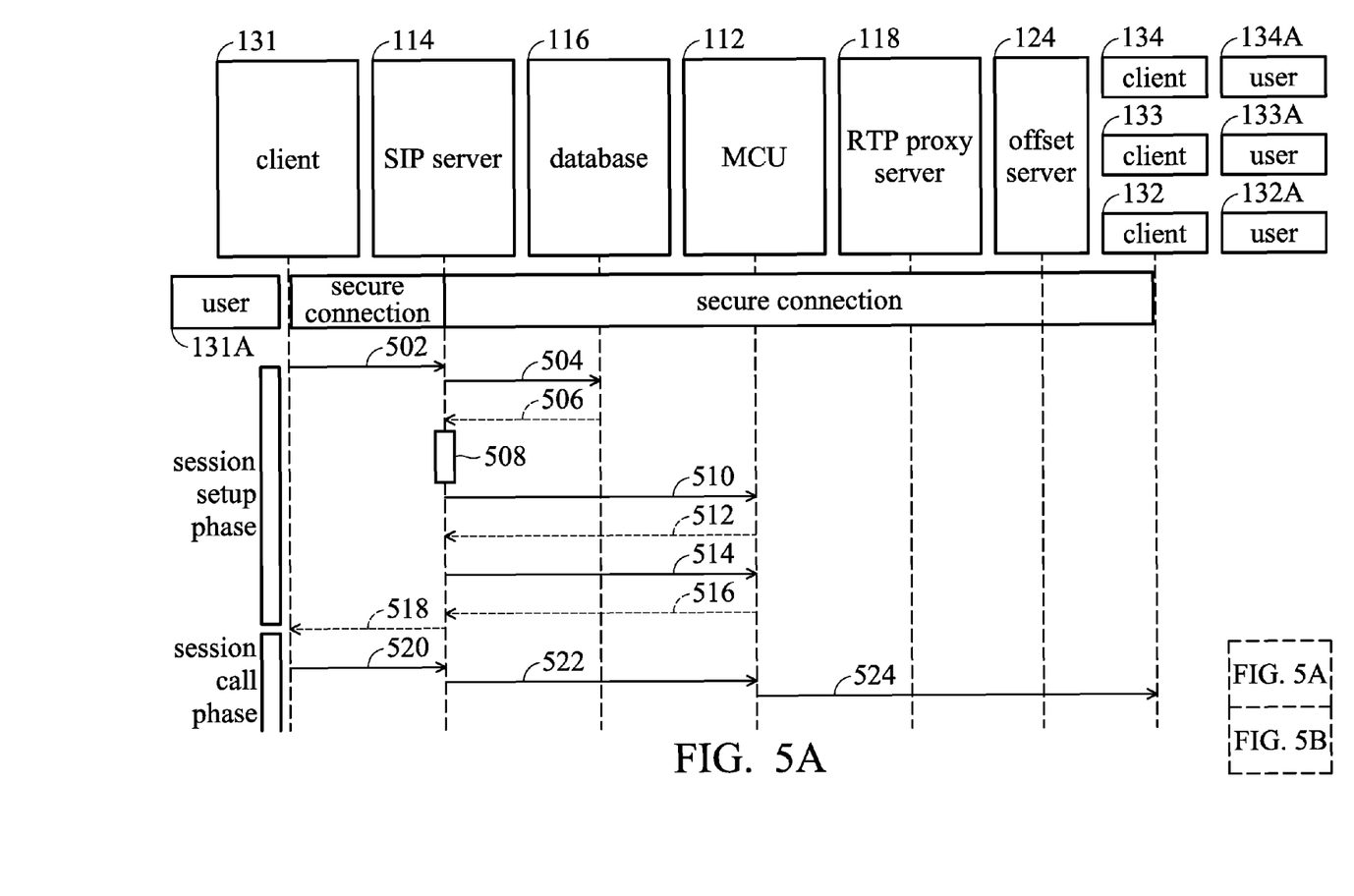
FIGS. 5A-5B are portions of a flow chart of establishing and tearing down a video conferencing session in accordance with an embodiment of the invention.
Figure 5B:
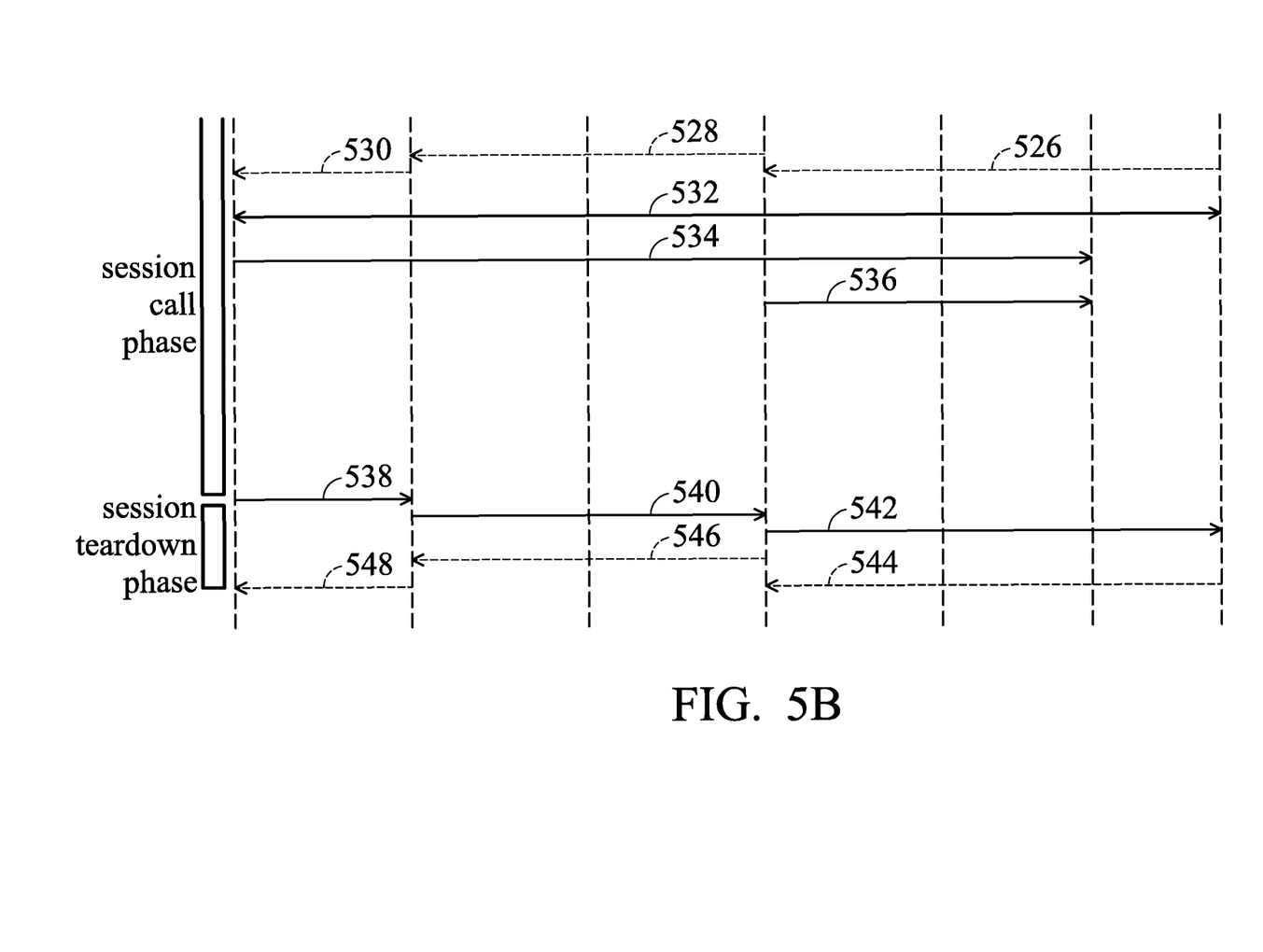

FIGS. 5A-5B are portions of a flow chart of establishing and tearing down a video conferencing session in accordance with an embodiment of the invention. The difference between FIG. 4 and FIGS. 5A-5B is that the flow in FIGS. 5A-5B is for establishing and tearing down a video conferencing session having more than two participants, and the video conferencing session utilizes the MCU 112 to exchange packets from different participants in the video conference rather than using a peer-to-peer connection. In the embodiment of FIGS. 5A and 5B, the users 131A, 132A, 133A, and 134A are in the same video conference, and each of the users 131A-134A has a respective client 131~134. In the flow shown in FIGS. 5A and 5B, steps 502~518 can be regarded as a session setup phase. However, steps 504 and 506 are different from those in FIG. 4. For example, in step 504, the SIP server 114 queries the network address of the MCU 112 from the database 116, and the database 116 respond the network address of the MCU 112 to the SIP server 114 (step 506).

In addition, in step 510, the SIP server 114 transmits a relaying and recording request signal to the MCU 112, and the MCU 112 sends relay information to the SIP server (step 512). Then, the SIP server 114 transmits a session initiation signal (e.g. SIP INVITE command) to the MCU 112, and the MCU 112 sends an acceptance success signal (e.g. SIP 200 OK) to the SIP server 114 (step 516). The SIP server responds by sending the acceptance success signal to the client 131 (step 518). It should be noted that steps 510~518 can be regarded as a session setup phase.

In step 520, the client 131 transmits a plurality of conference reference signals (e.g. REFERs) to the SIP server 114, and the SIP server 114 transmits the conference reference signals to the MCU 112 (step 522). In step 524, the MCU 112 transmits a session initiation command (e.g. SIP INVITE command) to the remote clients (e.g. clients 132~134) according to the conference reference signals (step 524). In step 526, each of the remote users 132A-134A may accept the video conference via their respective client 132~134, and the remote clients 132~134 may respond an acceptance success signal (e.g. SIP 200 OK command) to the MCU 112 (step 526). In step 528, the MCU transmits a plurality of conference acceptance signals to the SIP server 114, and the SIP server 114 transmits the conference acceptance signals to the client 131 (step 530).

In step 532, the client 131 establishes a video conference with the clients 132~134 via the MCU 112 and the RTP proxy server 118 using the secure real-time transport protocol (SRTP). During the video conference, the client 131 and the MCU 112 may respectively transmit its time offset information to the offset server 124 (steps 534 and 536), thereby correcting the time offset. It should be noted that steps 520~536 can be regarded as a conference session phase.

In step 538, the user 131A transmits a conference teardown signal (e.g. SIP BYE command) to the SIP server via the client 131, and the SIP server 114 transmits the conference teardown signal to the MCU 112 (step 540). In step 524, the MCU 112 simultaneously transmits the conference teardown signal to each of the remote clients 132~134. When each of the users 132A-134A respectively accepts termination of the video conference via their clients 132~134, the clients 132~134 respond by sending an acceptance success signal (e.g. SIP 200 OK command) to the MCU 112 (step 544). In step 546, the MCU transmits the acceptance success signal to the SIP server 114, and the SIP server 114 transmits the acceptance success signal to the client 131 (step 548), thereby tearing down the video conference. It should be noted that steps 538~548 can be regarded as a conference teardown phase.

Figure 6:
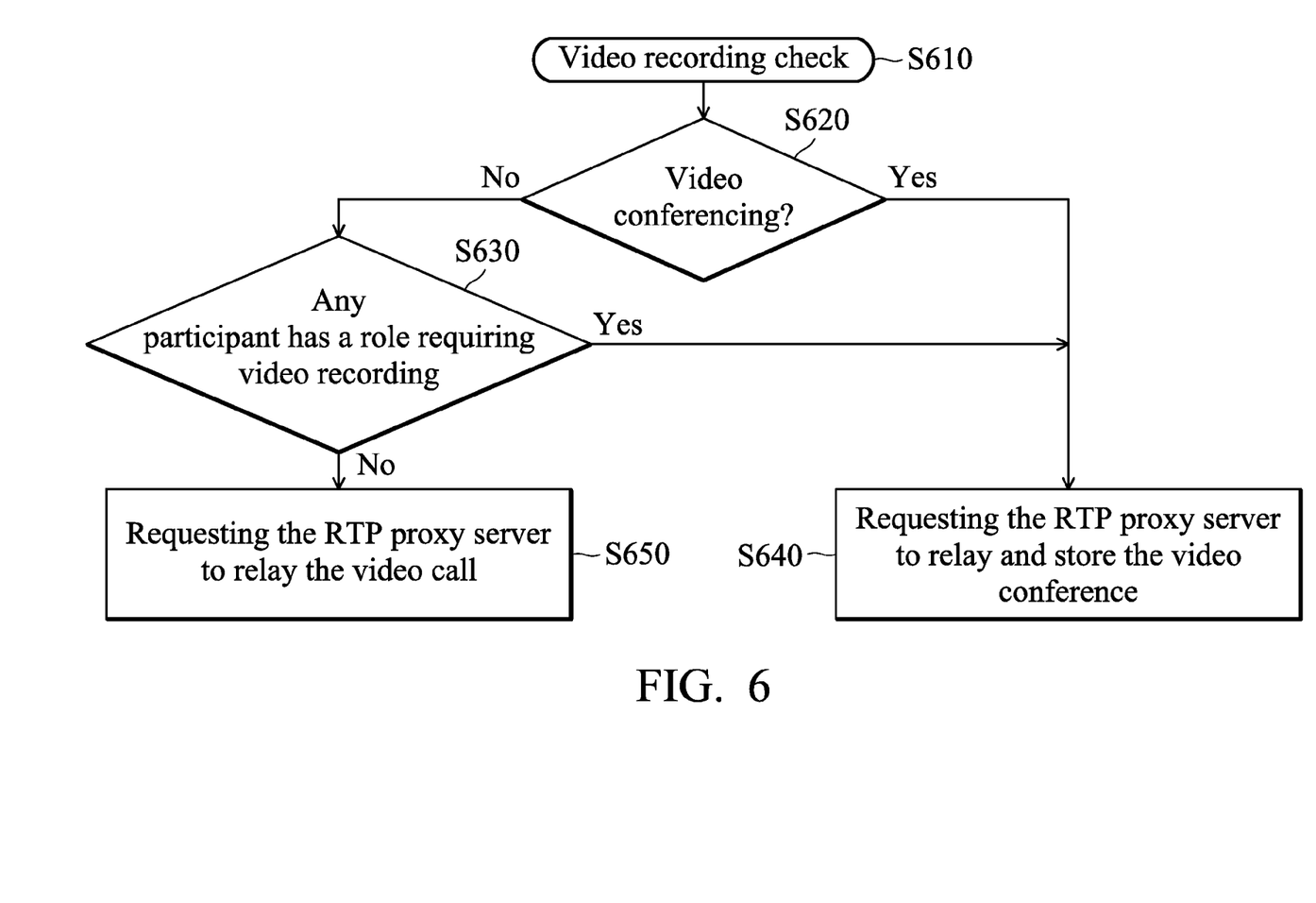
FIG. 6 is a flow chart of a method for determining whether to record the video conference in accordance with an embodiment of the invention.

FIG. 6 is a flow chart of a method for determining whether to record the video conference in accordance with an embodiment of the invention. In step S610, video recording check is activated, such as step 408 in FIG. 4 and step 508 in FIGS. 5A and 5B. In step S620, it is determined whether the current video session is a video conference (i.e. more than two participants). If the current video session is a video conference, step S640 is performed. If the current video session is not a video conference (i.e. 1-on-1 video call), step S630 is performed. In step S630, it is determined whether any participant has a role that requires video recording. If so, step S640 is performed; otherwise, step S650 is performed. In step S640, the RTP proxy server 118 is requested to relay and store packets of the video conference. In step S650, the RTP proxy server 118 is requested to relay the packets of the video call. Specifically, if the current video session is a video conference (i.e. having more than two participants), the SIP server 114 will activate the video recording function. If the current video session is an 1-on-1 video call, the SIP server 114 may further determine whether the participants in the video call have a role that requires video recording. For example, when any one of the two participants is a care provider (e.g. healthcare provider), the video recording function is activated. Alternatively, when the combination of the two participants in the video call is a care provider and a care receiver, the video recording function is activated.

Figure 7:
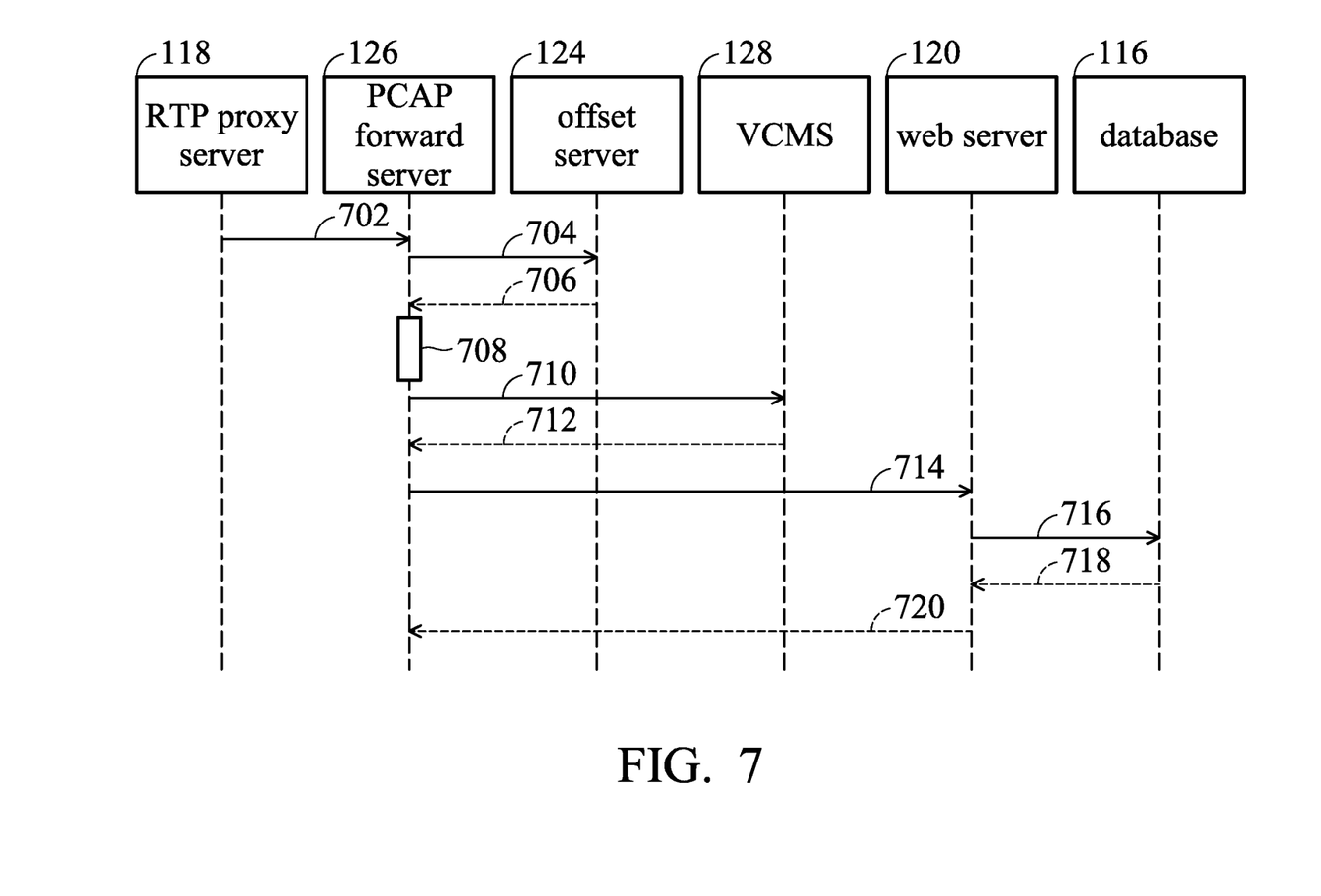
FIG. 7 is a flow chart of processing the recorded video conference in accordance with an embodiment of the invention.

FIG. 7 is a flow chart of processing the recorded video conference in accordance with an embodiment of the invention. In step 702, the RTP proxy server 118 transmits the captured video conference file (e.g. PCAP file) to the PCAP forward server 126. In step 704, the PCAP forward server 126 queries the time offset information of the video conference file from the offset server 124, and the offset server 124 reports the time offset information of the video conference file to the PCAP forward server 126. In step 708, the PCAP forward server 126 performs pre-processing on the video conference file such as adding associated parameters.

In step 710, the PCAP forward server 126 transmits the video conference file and associated parameters to the VCMS 128, and the VCMS 128 responds to the PCAP forward server 126 (step 712) with a media UUID of the video conference file. In step 714, the PCAP forward server 126 update the call history and the media UUID to the web server 120, and the web server 120 updates the call history to the database 116. In step 718, the database 116 responds by sending an update success signal to the web server 120 when the call history is successfully updated, and the web server 120 responds by sending the update success signal to the PCAP forward server 126 (step 720).

Figure 8:
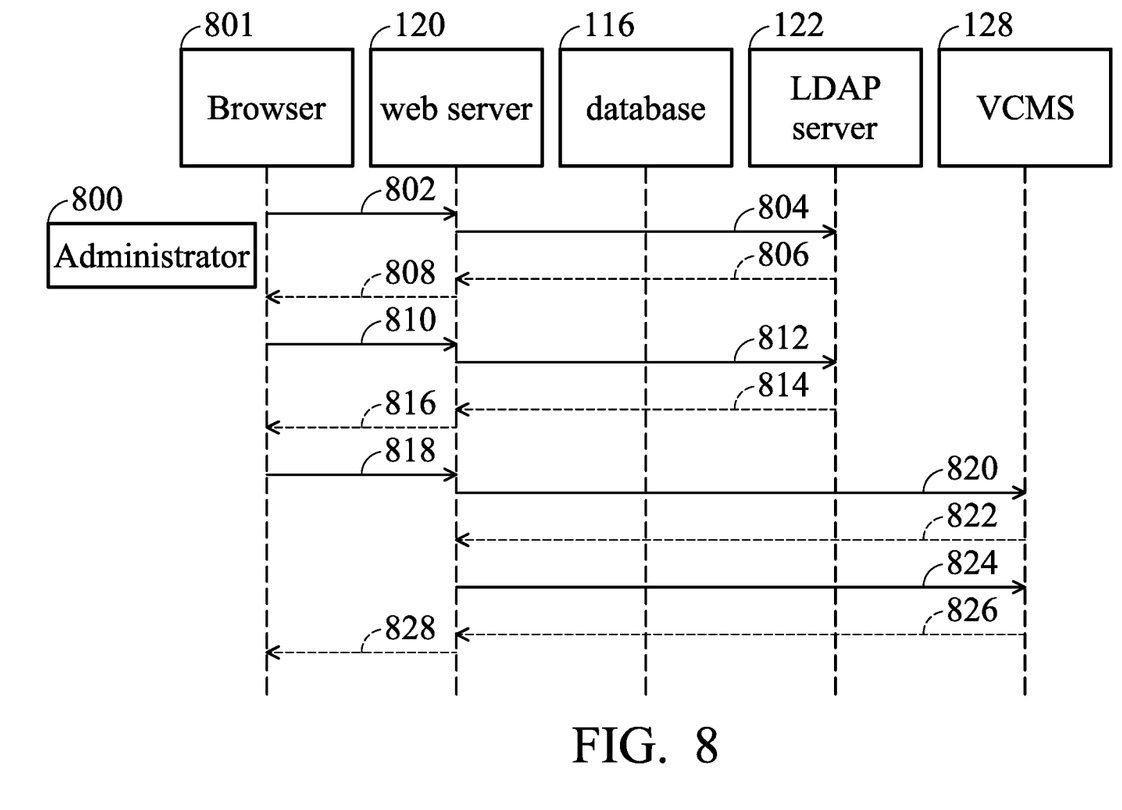
FIG. 8 is a flow chart of an administrator searching the call history and displaying a selected video conference in accordance with an embodiment of the invention.

FIG. 8 is a flow chart of an administrator searching the call history and displaying a selected video conference in accordance with an embodiment of the invention. In the embodiment of FIG. 8, the administrator 800 searches the recorded video conference files via a browser 801, and display a selected video conference file. In step 802, the administrator 800 logs onto the web server 120 via the browser 801. In step 804, the web server 120 transmits an authentication signal to the LDAP server 122. In step 806, after the authentication is approved, the LDAP server 122 responds with an authentication success signal to the web server 120. In step 808, the web server 120 responds by sending a logon success signal to the browser 801. In step 810, the administrator 800 sends a request signal to retrieve the call history via the browser 801, and the web server 120 transmits the request signal to the LDAP server 122 (step 812). In step 814, the LDAP server 122 transmits the call history to the web server 120, and the web server 120 transmits the call history to the browser 801 (step 816).

In step 818, the administrator 800 selects a video conference file for display via the browser 801, and the browser 801 transmits the information of the selected video conference file to the web server 120. In step 820, the web server 120 transmits a request signal to the VCMS 128 to retrieve the video conference file. In step 822, the VCMS 128 responds to the web server 120 with the media UUID of the selected video conference file, and the web server 120 may transmit a streaming request signal to the VCMS 128 according to the media UUID (step 824). In step 826, the VCMS 128 streams the content of the video conference file to the web server 120, and the web server 120 further streams the content of the video conference file to the browser 801 for viewing by the administrator 800.

In view of the above, a cloud video system is provided. The cloud video system includes a cloud server and a plurality of clients. The clients are connected to the cloud server via a network, and each client has an individual role. When a first client establishes a video conference with other clients, the cloud server determines whether to record the video conference according to the individual role of each client. In addition, the administrator of the cloud video system may retrieve the call history of each client from the cloud server, selects one of the video conference files from the retrieved call history, and display the selected video conference file. Since each video conference file has an individual media UUID in the VCMS, the selected video conference file can be retrieved from the VCMS according to the media UUID of the selected video conference file.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A cloud video system, comprising:
    a cloud server; and
    a plurality of clients, wherein the clients are connected to the cloud server via a network, and each client has an individual role,
    wherein when a first client of the clients has established a video session call with other clients of the clients, the cloud server determines whether to record the video session call according to the individual role of each client in the video session call,
    wherein the cloud server comprises a real-time transport protocol (RTP) proxy server, a packet-capture (PCAP) forward server, and a video content management system,
    wherein the RT proxy server captures the video session call as a video conference file, and transmits the captured video conference file to the PCAP forward server,
    wherein the PCAP forward server transmits the video conference file and associated parameters to the video content management system, and retrieves a media universally unique identifier (UUID) from the video content management system.

2. The cloud video system as claimed in claim 1, wherein when the cloud server determines that the first client and the other clients belong to a specific role combination, the cloud server determines to record the video session call.

3. The cloud video system as claimed in claim 2, wherein the specific role combination comprises a care provider and a care receiver.

4. The cloud video system as claimed in claim 1, wherein when the number of clients in the video session call is greater than 2, the cloud server determines to record the video session call.

5. The cloud video system as claimed in claim 4, wherein the first client and the other clients exchanges packets via a multipoint control unit of the cloud server to perform a video conference.

6. The cloud video system as claimed in claim 5, wherein each of the first client and the other clients transmits local time information to the cloud server to correct time offsets between the clients in the video conference.

7. The cloud video system as claimed in claim 1, wherein the cloud server further comprises a web server and a database, and the PCAP forward server updates a call history and the media UUID associated with the video conference file to the database via the web server.

8. The cloud video system as claimed in claim 7, wherein the cloud server further comprises a lightweight directory access protocol (LDAP) server, configured to store user information of each client, wherein the user information comprises the individual role, a phone book, and a call history of each client.

9. The cloud video system as claimed in claim 8, wherein an administrator of the cloud video system retrieves the call history of each client from the LDAP server via the web server, and selects a specific video conference file from the retrieved call history,
    wherein the web server retrieves a specific media UUID associated with the specific video conference file from the video content management system, and streams the specific video conference file from the video content management system according to the specific media UUID.

* * * * *